United States Patent Office 3,268,447
Patented August 23, 1966

3,268,447
FIRE RESISTANT FLUIDS FOR FABRICATING MAGNESIUM AND OTHER METALS
James R. Dickey, Elizabeth, and Donald A. Pattison, Roselle, N.J., and Beverly A. Pawson, Cambridge, Mass., assignors to Esso Research and Engineering Company, a corporation of Delaware
No Drawing. Filed June 14, 1963, Ser. No. 287,791
16 Claims. (Cl. 252—33.4)

The present invention relates to fire resistant fluids for fabricating magnesium and other metals. In a specific aspect this invention relates to fluids of the water-in-oil emulsion type. Fluids prepared according to the preferred form of the present invention are so designed that they will work effectively even with alloys, compounds, elements, mixtures, etc. which are highly reactive with water (e.g. sodium metal).

By the term "fabricating" as used herein, it is meant to include (but not to be limited thereby) those metal working operations generally described as rolling, machining, drawing, forging, pressing, broaching, cutting, extruding and the like.

Background

Metal fabricating operations, e.g. machining, are accompanied by the generation of heat which must be dissipated by some means. Moreover, these fabricating operations also require lubrication.

In the prior art, such materials as mineral lubricating oils have been used to achieve the desired lubrication while coolants, such as water, have been used to dissipate the heat. Because of inevitable leaking, etc., in the lubricant and cooling systems, contamination often resulted. Consequently, commercial enterprises have produced a number of materials which function as both a lubricant and a coolant, thereby avoiding this problem.

While mineral oil is an excellent lubricant, it is generally regarded as a poor coolant when compared to water because the specific heat of mineral oil is only about 0.5 that of water. On the other hand, it is well-known that, except under special conditions, water is not a good lubricant.

Taking advantage of the respective properties of these two materials (and their low cost), many companies have produced fluids of the oil-in-water emulsion type and a few have produced fluids of the water-in-oil emulsion type. Alternatively, some enterprises have produced water-based chemical cutting fluids.

While these fluids are generally effective for many ordinary applications, they are generally undesirable for fabricating lighter metals such as magnesium and are highly reactive to metallic sodium. These lighter metals are highly reactive, especially in the presence of water. Thus the oil-in-water emulsion fluids and the water-based chemical fluids are immediately ruled out. Straight mineral oil fluids can be dangerous because they provide a source of fuel for fire if one should begin. More importantly, however, they do not provide the necessary cooling action. Prior art water-in-oil emulsions, although avoiding many of these problems, have generally proven undesirable for fabricating magnesium, etc. because of one or more of the following: (a) the tendency to invert or separate, particularly on heating to, for example, 150° F. (this creates a fire hazard), (b) staining of the metal being fabricated, etc.

As illustrative of the prior art, see U.S. Patents 2,617,769, 2,659,252, 2,981,128, and 2,927,079 which are incorporated herein by express reference.

Discovery

It has now been discovered and this discovery forms the basis of the present invention that a fire-resistant fluid of the water-in-oil emulsion type can be prepared which will be an effective coolant/lubricant, will not invert at temperatures above 150° F. (e.g. stable at 200° F. and higher), and which is substantially non-staining to magnesium.

This fluid comprises in certain proportions (based on a total formulation weight of 100) the following components:

| Component: | Parts by weight |
|---|---|
| (a) Mineral oil | Bulk residue |
| (b) Water | 30–55 |
| (c) Anionic emulsifier (expressed as 100% active sulfonate) | 1.2–3.5 |
| (d) Two nonionic emulsifiers (expressed as 100% active) | 0.5–5.0 |
| (e) Vapor phase rust inhibitor | 0.01–0.2 |
| (f) Bactericide | 0.01–0.2 |
| (g) Antioxidant | 0.1–1.0 |
| Total | 100 |

As indicated, one component of the composition contemplated herein is a mineral oil. Undoubtedly, certain synthetic oils might be employed without departing completely from the general concept embodied in this invention. However, experience has shown that such oils are generally deficient in one or more desired properties, e.g. they are staining, they are flammable, they are too viscous, they do not form stable emulsions, etc. Not only are synthetic oils generally undesirable, but that class of mineral oils referred to as mineral lubricating oils (i.e. a viscosity of from 80 to 2500 SUS at 100° F.) are not generally desirable, either. These oils are often deficient in their overall cooling characteristics and are increasingly difficult to handle as their viscosity increases. The effect of the mineral oil component on the metallurgical properties of the metals being fabricated can be quite pronounced since the oil will contribute to the time/temperature history of the work piece. The mineral lubricating oils (e.g. a viscosity of 850 SUS at 100° F.) also tend to adhere in thick films to the surfaces of the work piece as well as to tools, etc. Moreover, the more viscous oils tend to hold metal chips, etc. in suspension long after such activity has served any useful purpose. This phenomenon creates problems especially where it is desired to recycle the fluid for reuse.

Suitable oils for use in this invention include those mineral oils having a viscosity at 100° F. below conventional lubricating oils, i.e. generally from 25 to 58 SUS, preferably from 30 to 55 SUS. These oils may be paraffinic, aromatic or naphthenic. Paraffinic oils are preferred, especially those having a viscosity at 100° F. of from 35 to 52 SUS, e.g. about 40 SUS. Mineral oils having a viscosity at 100° F. of about 40 SUS seem to represent the optimum in terms of cooling characteristics, etc. Fluids prepared according to this invention will comprise the various other components in suitable amounts and the remainder will be the oil. The fluids will usually contain from 43 to 68 parts by weight of oil, preferably 45 to 60 parts, e.g. 50 to 53 parts, based on a total weight of 100 parts.

A second component of the new compositions is water which will be present in amounts of from 30 to 55 parts by weight, preferably from 35 to 50 parts by weight, e.g. 41 to 45 parts by weight.

A third component of the new compositions is an anionic emulsifier. Suitable anionic emulsifiers are known to include the organo-metallic sulfonates of natural or synthetic origin. Suitable sulfonates are those having a molecular weight range of from about 300 to 1500. These sulfonates are the alkali metal and alkaline earth metal sulfonates, e.g. Ca, Na, Ba, Li, Mg, etc. The sodium and calcium sulfonates are preferred with sodium sulfonates being the more preferred. If desired, mixtures of the sulfonates may be employed, e.g. calcium and sodium sulfonates. It is preferred to use a single sulfonate, i.e. sodium sulfonate. With specific sulfonates, the following molecular weight ranges are preferred:

| | |
|---|---|
| Sodium sulfonate | 400–700 |
| Calcium sulfonate | 800–1100 |
| Barium sulfonate | 900–1200 |

The total amount of sulfonates employed will usually range from 1.2 to 3.5 parts by weight, preferably from 1.7 to 3.0 parts, e.g. about 2.0 parts based on 100% active sulfonate. Most commercially available sulfonates are 35, 45 or 63% active as determined by analytical method ASTM D–855. Suitable sulfonates include those prepared from alkylated or cycloalkylated benzene or naphthalene of suitable molecular weight. These sulfonates are commercially available and are well known to those skilled in the art.

The fourth component of the new compositions is a binary mixture of nonionic emulsifiers which is present in amounts of from 0.5 to 5 parts by weight, preferably 1.0 to 4.0 parts, e.g. 2.0 to 3.0 parts. The first nonionic emulsifier is ethoxylated alcohol formed by reacting up to 5 moles (e.g. 1–4 moles) of ethylene oxide with a mole of an alcohol, e.g. a $C_{10}$ to $C_{22}$ alcohol. These ethoxylated alcohols are commercially available. The second nonionic emulsifier is selected from the group consisting of $C_1$ to $C_6$ alcohols, $C_2$ to $C_6$ glycols and $C_2$ to $C_{12}$ (e.g. $C_2$–$C_6$) alkyl ethers (e.g. dimethyl ether, methylethylether, etc.). This second emulsifier supplements the action of the ethoxylated alcohol and acts as a coupling agent. It is preferred to use the ethoxylated alcohol and one of the remaining nonionic emulsifiers in a weight ratio of from about 1:1 to 2:1, e.g. about 1.5:1. The mixture of nonionic emulsifiers improves the stability of the water-in-oil emulsion and prevents its inversion into an oil-in-water emulsion at elevated temperatures.

The fifth component of the new compositions is a vapor phase rust inhibitor preferably having a vapor pressure similar to that of water so as to keep condensing water non-acidic and non-corrosive. This would include the volatile amines or other basic material, e.g. morpholine, ethylene diamine, cyclohexyl amine, etc., which would be present in these new compositions in amounts of from 0.01 to 0.2 part by weight, preferably from 0.02 to 0.1 part. Morpholine is the preferred rust inhibitor. While it is preferred to use a vapor phase rust inhibitor, it may be omitted in certain instances.

The sixth component is a bactericide which will be present in amounts of from 0.01 to 0.2 part by weight, e.g. 0.05 to 0.15 part. Suitable bactericides include the sodium salts of dichlorophene, hexachlorophene, etc., as well as orthophenyl phenol or its sodium salt and trichlorophenol or its sodium salt. While it is preferred to use a bactericide, it may be omitted in certain instances.

The seventh component of the new compositions is an antioxidant which is present in amounts of from 0.1 to 1.0 part by weight, e.g. 0.3 to 0.7 part. Suitable antioxidants include those of the phenolic type. 2,6-ditertiarybutyl-p-cresol is a preferred antioxidant. While it is preferred to use an antioxidant, it may be omitted in certain instances.

The new compositions of the present invention may also contain minor quantities of other ingredients which do not lessen the effectiveness of the components described above, e.g. dyes, etc.

These novel compositions can be prepared by simply adding the various components to each other in practically any order and then mixing them. Usually, it will be found preferable to add the various components to the oil (except for water) and then add the water slowly to the oil solution in suitable mixing equipment. If desired, homogenizing equipment may be employed, although it is not required. Temperatures of from 150° to 200° F. or higher may be employed, e.g. 180° F. One of the added advantages of these fluids is that they are easy to prepare and don't require special equipment.

A superior fluid prepared according to a preferred form of the present invention had the following composition:

| Component: | Parts by weight |
|---|---|
| (a) A paraffinic mineral oil having a viscosity at 100° F. of 40.3 SUS | 51.36 |
| (b) Water | 43.0 |
| (c) A commercial sodium sulfonate having a 490 min. mol. wt. (63% active) | 2.5 |
| (d) 1.5 wt. percent of the reaction product of 1.5 moles ethylene oxide with tridecylalcohol and 1.0 wt. percent of diethylene glycol | 2.5 |
| (e) Morpholine | 0.04 |
| (f) Sodium salt of dichlorophene | 0.10 |
| (g) 2,6-ditertiary butyl-p-cresol | 0.5 |

TABLE I.—REACTION OF VARIOUS FLUIDS WITH SODIUM AND MAGNESIUM

| Fluid | Sodium | Magnesium |
|---|---|---|
| Water | Violent reaction with sparks and rapid hydrogen evolution; metal moves about on surface of water. | Slow hydrogen evolution. |
| Commercial oil in water emulsion. | Violent reaction with sparks and rapid hydrogen evolution; metal moves about on surface of fluid. | Do. |
| Present invention (water in oil emulsion). | Moderate hydrogen evolution without sparks. Metal is below surface of fluid and does not move about. | No noticeable reaction. |

Thus it can be seen that the new compositions offer a considerably reduced fire hazard when working with light metals. They are effective on magnesium and can even be used in the presence of metallic sodium—contrary to other commercial fluids. When field tested under actual working conditions (Test EPX) these new compositions were found to be extremely effective and superior to other commercially available fluids. Their coolant capacity was adequate, they were quite stable, and were substantially non-staining. When compared with prior art water-in-oil emulsions the present fluids are shown to be more stable, particularly at higher temperatures. This offers a large safety factor (no inversion or separation) even under extreme conditions, i.e. high temperatures and little agitation.

Having described our invention with a certain degree of particularity, it will be realized that numerous modifications and adaptations may be made within the spirit and scope of the invention as hereinafter claimed.

What is claimed is:

1. A water-in-oil emulsion composition suitable for use in fabricating magnesium which consists essentially of:
   (a) About 51 parts of a mineral oil having a viscosity at 100° F. of about 40 SUS,
   (b) about 43 parts of water,
   (c) about 2.5 parts of sodium sulfonate having a molecular weight of about 490 and prepared from a member selected from the group consisting of alkylated and cycloalkylated benzenes and naphthalenes,
   (d) about 1.5 parts of the reaction product of 1.0 mole of tridecylalcohol and 1.5 moles of ethylene oxide,
   (e) about 1.0 part of diethylene glycol,
   (f) about 0.04 part of morpholine, and
   (g) about 0.5 part of 2,6-ditertiary butyl-p-cresol, all of said parts being parts by weight.

2. A composition as defined in claim 1 which also contains about 0.1 part by weight of the sodium salt of dichlorophene.

3. A water-in-oil emulsion composition suitable for use in fabricating magnesium which consists essentially of:
(a) from 45 to 60 parts of a mineral oil having a viscosity at 100° F. of from 35 to 52 SUS,
(b) from 35 to 50 parts of water,
(c) from 1.7 to 3.0 parts of an anionic emulsifier, said anionic emulsifier being an organo metal sulfonate having a molecular weight of from 300 to 1500, said metal being selected from the group consisting of alkali metals, alkaline earth metals, and mixtures thereof, and
(d) from 1.0 to 4.0 parts of a binary mixture of non-ionic emulsifiers, said mixture of non-ionic emulsifiers consisting of ethoxylated alcohol formed by reacting from 1-4 moles of ethylene oxide with 1 mole of $C_{10}$ to $C_{22}$ alcohol, and a member selected from the group consisting of $C_2$–$C_6$ glycols, $C_1$–$C_6$ alcohols and $C_2$–$C_{12}$ alkyl ethers, said ethoxylated alcohol and said selected member being present in a weight ratio of from 1:1 to 2:1, all of said parts being parts by weight and the sum of said parts approximating 100.

4. A composition as defined in claim 3 which also contains from 0.01 to 0.20 parts of a vapor phase rust inhibitor.

5. A composition as defined in claim 3 which also contains from 0.1 to 1.0 parts of an antioxidant.

6. A composition as defined in claim 3 wherein said selected member in said mixture of nonionic emulsifiers is $C_2$ to $C_6$ glycol.

7. A composition as defined in claim 6 wherein said anionic emulsifier comprises sodium sulfonate having a molecular weight of from 400–700 and prepared from a member selected from the group consisting of alkylated and cycloalkylated benzenes and naphthalenes.

8. A water-in-oil emulsion composition suitable for use in fabricating magnesium and other metals which are highly reactive with water which consists essentially of:
(a) a mineral oil having a viscosity at 100° F. of 25–58 SUS,
(b) from 30–55 parts of water,
(c) from 1.2–3.5 parts of an anionic emulsifier, said anionic emulsifier being an organo-metal sulfonate having a molecular weight of from 300–1500 and prepared from a member selected from the group consisting of alkylated and cycloalkylated benzenes and naphthalenes, and
(d) from 0.5 to 5.0 parts of a mixture of nonionic emulsifiers, said mixture of nonionic emulsifiers consisting of ethoxylated alcohol formed by reacting up to 5 moles of ethylene oxide with 1 mole of $C_{10}$–$C_{22}$ alcohol and a member selected from the group consisting of $C_1$–$C_6$ alcohols, $C_2$–$C_6$ glycols and $C_2$–$C_{12}$ alkyl ethers, all of said parts being parts by weight and the sum of said parts approximating 100.

9. A composition as defined in claim 8 wherein said anionic emulsifier is selected from the group consisting of sodium sulfonate having a molecular weight of 400–700, calcium sulfonate having a molecular weight of 800–1100, barium sulfonate having a molecular weight of 900–1200, and mixtures thereof.

10. A composition as defined in claim 9 wherein said selected member in said mixture of nonionic emulsifiers is $C_2$–$C_6$ glycol.

11. A composition as defined in claim 10 which also includes from 0.1 to 1.0 part of an antioxidant.

12. A composition as defined in claim 11 wherein said antioxidant is 2,6-ditertiary butyl-p-cresol.

13. A composition as defined in claim 11 which also includes from 0.01 to 0.2 part of a vapor phase rust inhibitor.

14. A composition as defined in claim 13 wherein said vapor phase rust inhibitor is morpholine.

15. A composition as defined in claim 13 which also contains from 0.01 to 0.2 part of a bactericide.

16. A composition as defined in claim 15 wherein said bactericide is the sodium salt of dichlorophene.

References Cited by the Examiner
UNITED STATES PATENTS

| | | | |
|---|---|---|---|
| 1,903,287 | 4/1933 | Cox | 252—390 |
| 2,225,533 | 12/1940 | Dewey | 252—51.5 |
| 2,320,263 | 5/1943 | Carlson et al. | 252—49.5 |
| 2,632,734 | 3/1953 | Nunn et al. | 252—49.5 |
| 2,668,146 | 2/1954 | Cafcas et al. | 252—49.5 |
| 3,039,969 | 6/1962 | Colucci et al. | 252—49.5 X |

OTHER REFERENCES

Emulsions and Detergents, 8th Ed., Union Carbide and Carbon Corporation, page 9.

Encyclopedia of Surface Active Agents, vol. I, Chemical Publishing Co. Inc., New York, 1952, pp. 23, 120, 121, 128, 129.

Pesticide Index, ed. by D. Frear, College Science Publishers, State College, Pa., 1961, p. 68.

DANIEL E. WYMAN, *Primary Examiner.*

J. R. McBRIDE, P. P. GARVIN, *Assistant Examiners.*